United States Patent [19]

Shih-Cheng

[11] Patent Number: 4,691,626
[45] Date of Patent: Sep. 8, 1987

[54] PORTABLE AND SIMPLE BARBECUE SPIT STRUCTURE

[76] Inventor: Tseng Shih-Cheng, No. 36 Ho-Fong Street, Shih-Lin District, Taipei, Taiwan

[21] Appl. No.: 939,627

[22] Filed: Dec. 8, 1986

[51] Int. Cl.$^4$ ............................................. A47J 37/04
[52] U.S. Cl. ................................................ 99/421 H
[58] Field of Search ......... 99/421 R, 421 H, 421 HH, 99/421 V, 326, 334

[56] References Cited

U.S. PATENT DOCUMENTS

| | | | |
|---|---|---|---|
| 77,349 | 4/1868 | Bigelow | 99/421 H |
| 2,467,480 | 4/1949 | Hudson | 99/421 H |
| 2,477,183 | 7/1949 | Humensky | 99/421 H |
| 2,627,854 | 2/1953 | Saua | 99/421 H X |
| 2,654,307 | 10/1953 | Nisenson | 99/421 H |
| 2,938,450 | 5/1960 | Carpenter et al. | 99/421 H X |

*Primary Examiner*—H. Hampton Hunter

*Attorney, Agent, or Firm*—Asian Pacific International Patent and Trademark Office

[57] ABSTRACT

It is a portable and simple barbecue spit device, particularly, a barbecue spit for outdoor barbecue activities. The spit device mainly comprises two supporting rods to be driven into ground, a rotary spit mounted on the top ends of the two supporting rods; the rotary spit has a hand crank and a U-shaped member welded on the vertical position of the rotary spit so as to form a left and right hooks, two opposite forks mounted around the rotary spit. Before the barbecue spit structure being carried, two protective sleeves should be put on the front tips of the two forks respectively to form a carrying handle; simultaneously, the bottom end of the rotary spit and the front ends of two supporting rods are put in same length so as to have the two supporting rods mounted into the left and right hooks respectively; then, a sleeve is mounted over the front ends of the two supporting rods and the rotary spit bundled together for carrying convenience.

5 Claims, 4 Drawing Figures

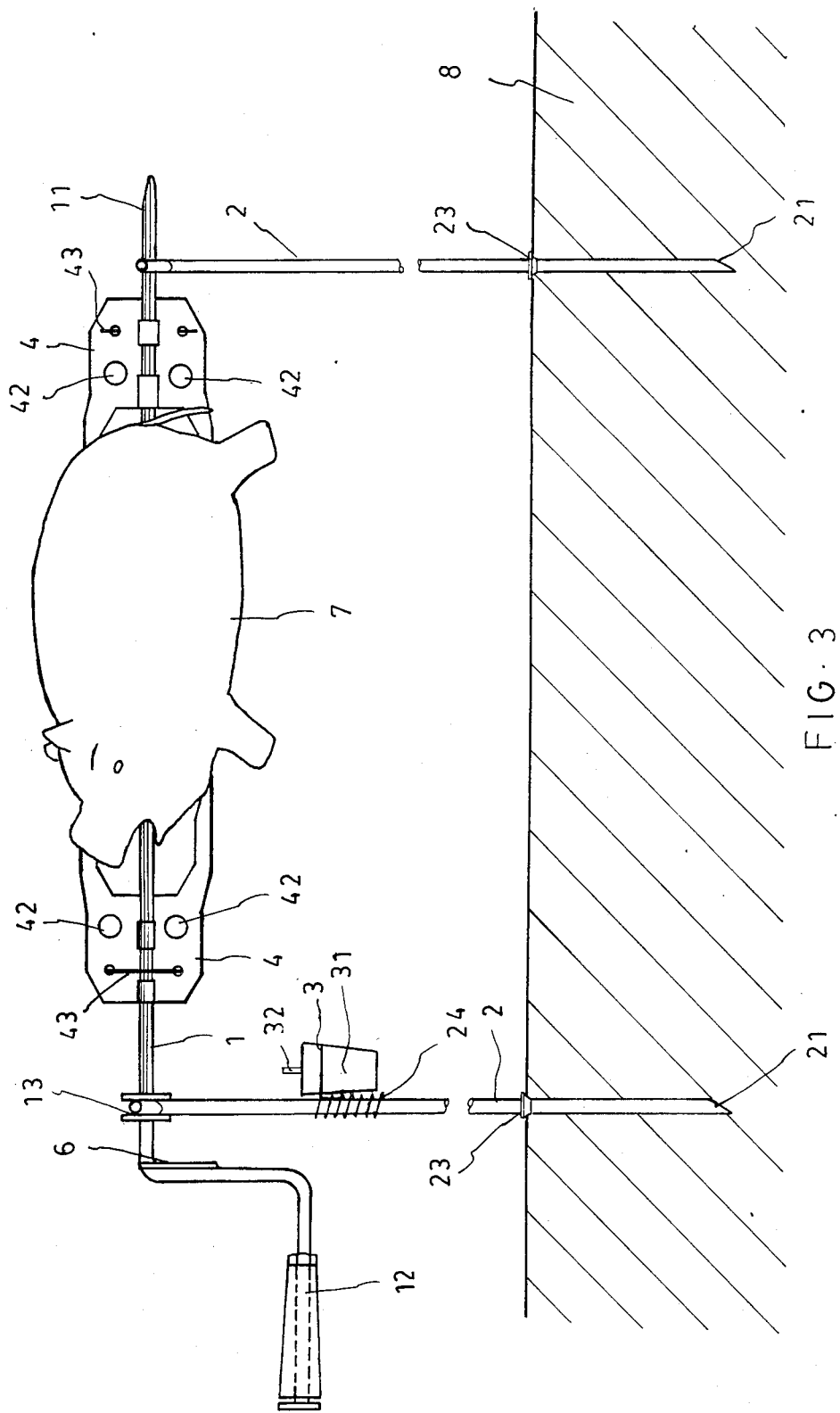

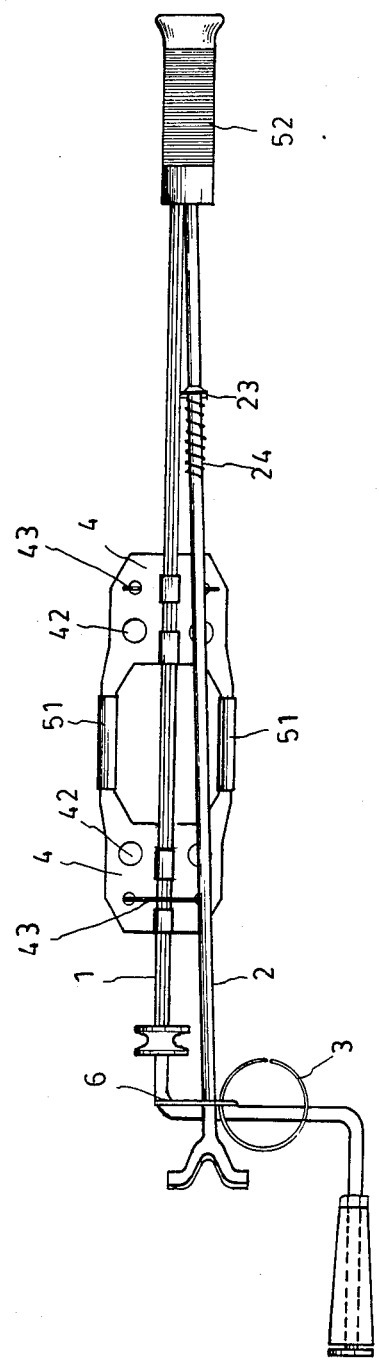

PORTABLE AND SIMPLE BARBECUE SPIT STRUCTURE

BACKGROUND OF THE INVENTION

In the competitive industrial world, most people are likely suffering from their working pressure; they are susceptible to being tired of working and nervous. Therefore, a holiday is necessary to relax their mind and body. In various recreation activities, going to the natural world or outdoor is the best way to get fresh air and better visual field, such as hiking or a barbecue picnic, etc. It has become one of most popular activities.

In a barbecue picnic, the size of the meat to be roasted usually determines the type of a barcecue apparatus; for example, when roasting a small slice of meat, a disc or grill may be used. In a large barbecue restaurant, a whole small pig, a whole chicken or duck may be roasted for commercial purpose; the large barbecue restaurant usually use a fixed type of barbecue spit or disc to be rotated with a motor. However, that kind of barbecue equipment is not good for a picnic barbecue for a small group of people or individual to carry.

SUMMARY OF THE INVENTION

In view of the aforesaid facts, the inventor has developed a simple and portable barbecue spit structure, which needs no electric power to operate, and can be set up quickly for outdoor operation. That is the prime object of the present invention.

Another object of the present invention is to provide a barbecue spit structure, of which the two forks can also be used as a handle for carrying the whole barbecue spit structure, which is particularly good for roasting a whole piece of livestock so as to increase the primitive barbecue atmosphere.

BRIEF DESCRIPTION OF THE DRAWINGS

FIG. 3 is a front view of the present invention being used for barbecue.

FIG. 4 is a front view of the present invention being disassembled for carrying.

DETAILED DESCRIPTION

Figure 1:
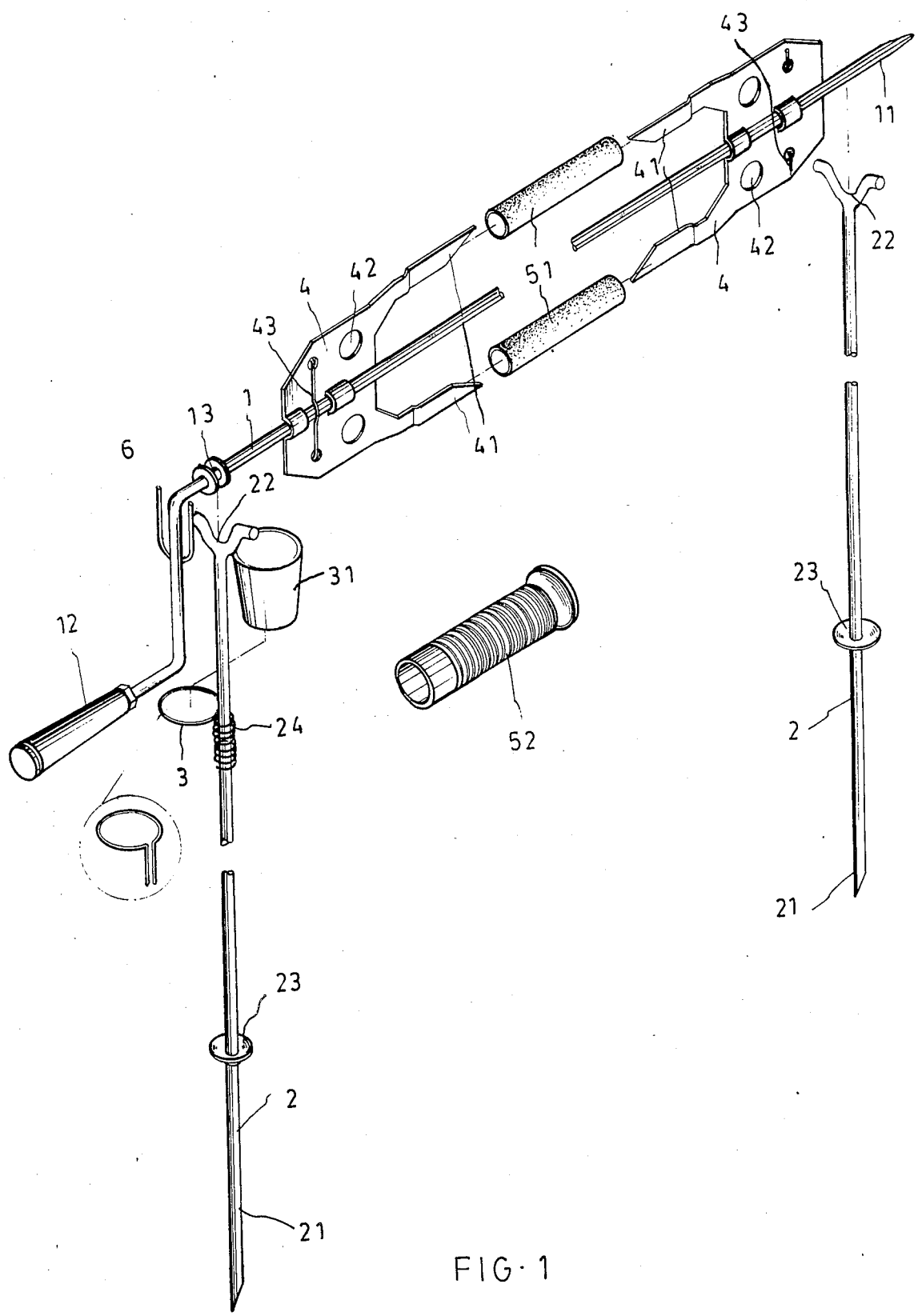
FIG. 1 is a disassembled view of the embodiment according to the present invention.
Figure 2:
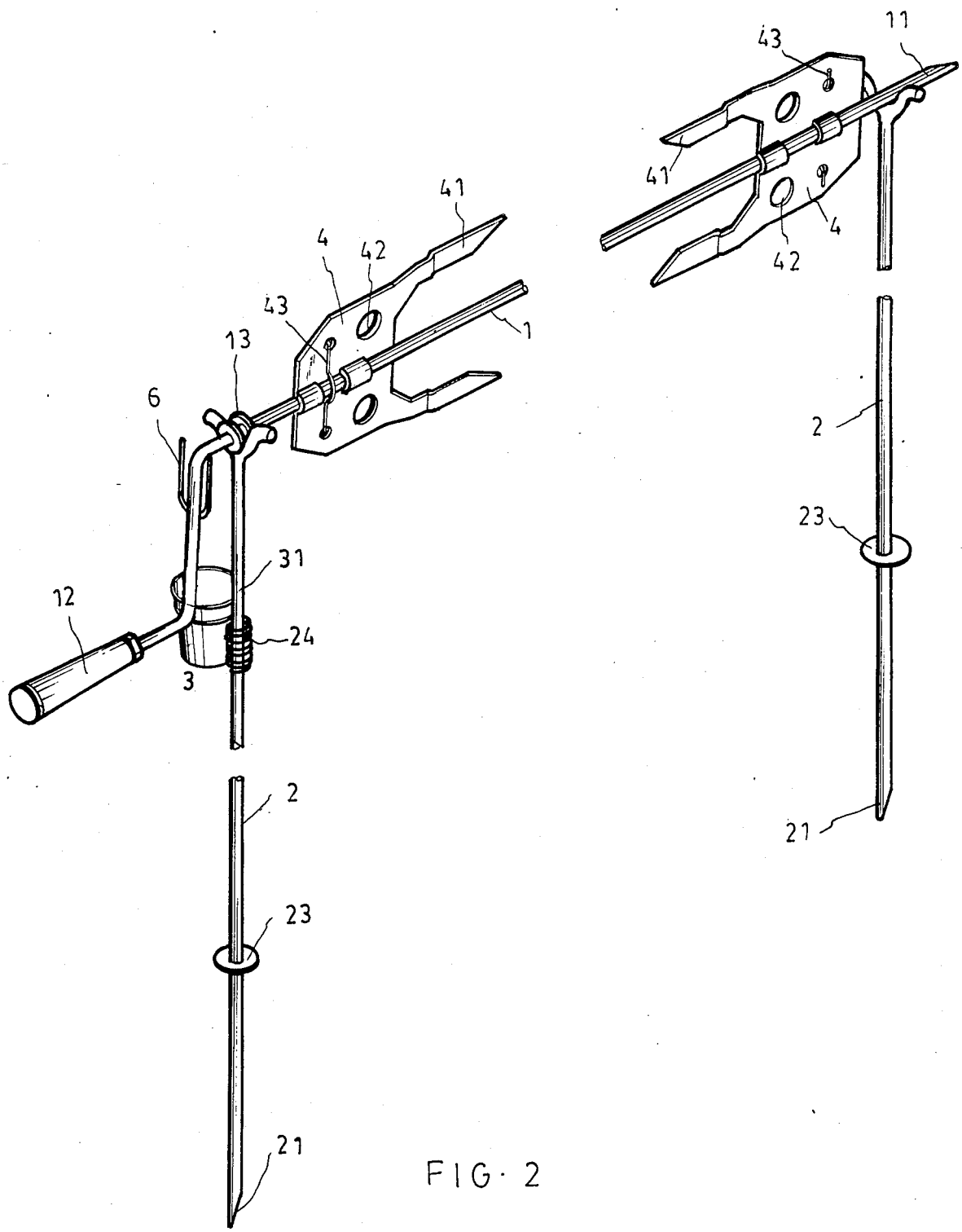
FIG. 2 is a perspective view of the present invention.

As shown in FIG. 1, the embodiment of the present invention mainly comprises a rotary spit 1, two supporting rods 2, two forks 4 mounted on the rotary spit (1), a spring 24 loosely mounted around one supporting rod 2, a cup rest 3, a cup 31, two protective sleeves 51 for holding with hand, and a sleeve 52. The lower end 21 of the two supporting rods 2 are formed into a sharp point respectively as shown in FIG. 2 so as to facilitate the same to be driven into the soil 8 as shown in FIG. 3. On a suitable part of each of the supporting rods 2, a stop disc 23 is fixedly attached so as to define the depth of the supporting rod 2 to be driven into the soil 8, and to have the two rods 2 maintained at the same height. The top end 22 of the rod 2 is formed into a fork so as to mount the rotary spit 1. The rotary spit 1 has a fastening member 13 to have the top end 22 of the supporting rod 2 mounted therein so as to maintain the rotary spit 1 in position and to rotate towards left or right, while the other end of the rotary spit 1 is simple mounted on the top end 22 of another supporting rod 2. The body portion of the rotary spit 1 is formed into an elliptical shape, and its front end 11 is formed into a sharp point so as to thrust into the food to be roasted (a small pig as shown in FIG. 3). The rotary spit 1 are mounted with two opposite forks 4 so as to thrust into and hold the food to be roasted in a position desired. Since the body portion of the rotary spit 1 is in an elliptical shape and the fork 4 is furnished with spring 43, the forks 4 can firmly be mounted around the spit 1 without rotating; further, each of the fork tips 41 has suitably been bent into several curves, which will prevent the food being roasted from slipping off the forks. Each of the forks 41 is furnished with through holes 42 to facilitate the user to move the fork or forks with fingers being put into the holes 42. The cup rest 3 is inserted into the spring 24 on the supporting rod so as to have the spring 24 tightly mounted around the supporting rod 2, and to prevent the spring 24 and the cup rest 3 from slipping along the supporting rod 2. The cup 31 filled with condiments is to be mounted in the cup rest 3 so as to facilitate the condiments to be applied to the meat being roasted as shown in FIG. 3, in which the cup 31 is provided with a small brush 32 for painting the condiments on the pig's body 7.

FIG. 1 and 4 illustrate a U-shaped member 6 being welded in the portion between the body portion of the rotary spit 1 and the hank crank 12. The U-shaped member 6 and the straight portion of the rotary spit 1 form into two hooks (a left and a right hooks). When the spit structure is not in use or to be carried for shipping, mount the two protective sleeves 51 on the front tips of the two forks 4 respectively to form a carrying handle and also to prevent the forks from injuring a person; then, put the lower ends of the supporting rods 2 and the front end 11 of the rotary spit 1 together and in the same length so as to put them into a sleeve 52. Simultaneously, put the other ends of the two supporting rods 2 into the left and right hooks respectively formed with the U-shaped member 6. By means of the elasticity of the supporting rods 2 and the rotary spit 1, the sleeve 52 can tightly be mounted on them. The cup rest 3 can also be mounted on the U-shaped member 6; then, the whole spit structure can be carried by holding the protective sleeve 51 for camping or the like. It is simple to set up or recover, and takes less space as well; therefore, it is deemed a novel and original disclosure.

I claim:

1. A portable and simple barbecue spit structure comprising:

two supporting rods for driving into ground vertically, and the front tip thereof being sharp, while the top ends are formed into a fork respectively;

a spring being movably mounted on said supporting rod;

a cup rest;

a rotary spit, the body portion thereof being formed into an elliptical shape, and having a hand crank, and in the vertical portion thereof a U-shaped member being welded so as to form into a left and a right hooks;

two forks, both of them being mounted around said rotary spit, and the front points thereof being used for thrusting into the food to be roasted and said forks being furnished with springs respectively.

two protective sleeves for protecting the points of said forks when not in use and a third sleeve for storing the spit and legs when disassembled and placed into a position parallel to each other;

and said barbecue spit structure being arranged for storage or transporting characterized in characterized that said two protective sleeves being mounted on the tips of said two forks respectively to form two handles for carrying convenience; and said two supporting rods being placed adjacent and parallel to said rotary spit, said two supporting rods being stored in said left and right hooks respectively, and said storing sleeve being placed over the ends of said supporting rods and said rotary spit thereby bundling together said spit structure for carrying convenience and safety.

2. A portable barbecue spit structure as claimed in claim 1, wherein a stop disc is furnished at a suitable point on said supporting rod for limiting the depth of said supporting rod to be driven into the ground, and also for defining the height of said two supporting rods.

3. A portable barbecue spit structure as claimed in claim 1, wherein said rotary spit is furnished with a fastening member that is to be mounted in the top fork of one said supporting rod so as to prevent said rotary spit from slipping off the fork upon being rotated.

4. A portable barbecue spit structure as claimed in claim 1, wherein said cup rest is to be inserted in said spring so as to force the same tightly around said supporting rod for fastening said cup rest in place, and then a condiment cup is mounted in said cup rest.

5. A portable barbecue spit structure as claimed in claim 1, wherein the front point of said fork is a sharp tip, and front portion of said fork is formed into several bent sections so as to hold the food to be roasted firmly without slipping off; and said fork is also furnished with finger holes so as to let a user hold and move the fork.

* * * * *